BEST AVAILABLE COPY

United States Patent Office.

ROBERT O. LOWREY, OF SALEM, NEW YORK.

*Letters Patent No.* 71,893, *dated December* 10, 1867; *reissue No.* 2,940, *dated May* 19, 1868.

IMPROVED COMPOSITION FOR THE MANUFACTURE OF WATER-PROOF PAPER, AND OTHER ARTICLES.

The Schedule referred to in these Letters Patent and making part of the same.

Be it known that I, ROBERT O. LOWREY, of Salem, in the county of Washington, and State of New York, have invented certain new and useful Improvements in the Treatment of Fibrous Material for a new composition for the manufacture of various articles, and for rendering the same water-proof, as hereinafter described.

To enable others skilled in the art to apply and use my invention, I will proceed to describe the same.

My invention consists in a new composition of matter, consisting principally of vegetable fibre, treated or united with certain chemical ingredients, for the production of a water-proof material for the manufacture of paper, and all other articles to which it may be adapted, the composition being intended to produce an article much stronger than ordinary paper, and that will not lose its strength when subjected to the action of water.

To form my composition, I take vegetable fibre of any kind, preferably such as is used in the manufacture of paper, and treat it with the following ingredients, either before or after it is formed into paper, or into articles, according to the use for which it is intended.

I prepare a solution, consisting of gelatine or animal glue, in the proportion of four ounces; of soap or similar extractive matter, two ounces; of glycerine or saccharine matter, or of both combined, two ounces. These ingredients I dissolve in from two to four quarts of water. I prefer to dissolve the gelatinous material in about one half of the water, and in the other half dissolve the soapy matter, and then add the saccharine or glycerine matter (or the two combined, if both are used) to either of the two solutions, and then mix the two solutions together; or, if preferred, the glycerine and saccharine matter (or either of them, if but one be used) may be united to the compound, after the two solutions are mixed together. The proportion of the glycerine or saccharine matter used will be varied, according to the degree of hardness or pliability that it is desired to give to the article. The less of these ingredients used, the harder, and the more, the softer the article will be. In like manner, also, if desired that the article should be soft and slippery in its nature, so as to prevent chafing by friction, the proportion of the soapy matter will be increased, as compared with the gelatinous. The quantity of water may be increased or decreased, according as it is desired to apply the compound in greater or less quantity to the fibre.

With the solution thus prepared, I saturate or treat the fibre or pulp, or the paper or other articles made therefrom, and then dry it more or less. After being thoroughly treated by this gelatinous compound, I then submit the material to the action of an astringent solution, which will render it insoluble in water. For this purpose I prefer to use alum and salt, dissolved in water, in about equal proportions. The material is retained in this astringent solution from ten to sixty minutes, according to its bulk or thickness, and the strength of the solution. This solution may be applied either hot or cold, it acting more energetically when hot.

The foregoing is the method I prefer, as giving the best results, and being the simplest; but in my experiments, I have ascertained that similar results may be obtained by mixing the gelatinous and astringent solutions together, and when precipitation has taken place, strain the liquid from the precipitated matter, and then add water to this precipitated material, and boil it over a brisk fire till dissolved, or the two solutions may be mixed, and heated until the precipitated matter is dissolved, and the solution thus obtained may be incorporated with the pulp, or the paper and other material may be saturated with it. The results thus obtained are inferior to those obtained by first treating the fibre or material to the action of the gelatinous and then to the astringent solution.

When it is desired to make paper, that is not water-proof, with a surface suitable for writing on, the astringent solution may be omitted. The gelatinous compound, in that case, may be used alone, as a sizing, or it may be mixed with vegetable sizing. The advantage of using this as a sizing is, that it can be mixed with the pulp, and run over the drying-rolls without difficulty or injury.

The chemical action of these ingredients upon each other is as follows: The soap, which is a compound of margaric, stearic, and oleic acids with an alkali, when acted upon by a solution of alum, a double decomposition takes place, the acids of the soap combining with the alumina of the alum, forming an insoluble compound. The gelatine, with its well-known properties, promotes the precipitation of the insoluble salts of alumina, and renders the compound more adhesive and permanent. Common salt, or chloride of sodium, promotes precipitation in the above, and forms a compound which is insoluble. It also prevents decomposition, and at the same time does not lessen the softness of the material acted upon. The glycerine and saccharine material removes any harshness or stiffness, rendering the material more soft and pliable, and at the same time gives a greater degree of permanence.

I have ascertained by my experiments that similar results may be produced, to a greater or less degree, by substituting, for the gelatine or glue, gum-arabic or senegal, dextrine, or caseine, or albumen, gluten, starch, or a mixture of any two or more of these, or any one or more of these ingredients may be used with gelatine or glue, or both.

Instead of the astringent solution composed of alum and salt, as previously described, the following may be used, viz, tannin or tannic acid, catechu, or any material containing tannin, gallic acid, boracic acid, alum, alone or combined with borax, or chrome alum, or any of the salts of the sesquioxide of chromium, or chloride of sodium alone may be used; or any two or more of these ingredients may be united, and used in place of the alum and salt, but not with so good effect.

If it be desired to give body to the material, without the use of so much fibre, as will be the case in the manufacture of ornamental and other articles of certain kinds, there may be added to the fibre or pulp, clay, or aluminous earths, plaster, calcined or otherwise, or ground slates or stone, or the oxides of metals, and for giving color to the mass, any suitable pigment or coloring-matter may be added.

It is obvious, also, that these materials may be added to the gelatinous compound, especially when it is desired to form a coating on the surface, instead of mixing them with the fibre or pulp.

By these means I produce a new composition, that is capable of being applied or used through a very wide range in the useful arts. It may be made into water-proof paper, of various styles and kinds; for the manufacture of bags, belting, cordage, twine, harness, roofing, and nearly all articles now made of cloth or leather. It may also be formed into utensils for household use, such as buckets, tubs, basins, &c.; also, into boats, barrels, and all similar articles, and articles of wearing-apparel, and also into ornamental articles, such as are now made of papier-mache and similar substances.

The process for the production of all these articles is substantially the same, and only varied to produce the objects desired. In the manufacture of twine, for instance, I mix my gelatinous compound with pulp, or after the pulp is formed into paper it may be so treated. The paper is then cut into strips, and twisted by suitable machinery, and then treated with the astringent solution, when it may be braided or woven into any article desired.

Having thus described my invention, what I claim, and desire to secure by Letters Patent, is—

1. The use of salt, in combination with any of the salts of alumina, or similar astringent material, for rendering a gelatinous compound or mixture insoluble in water, substantially as described.

2. The use of salt, in combination with the salts of alumina, or similar astringent material, for rendering soapy compounds or mixtures insoluble in water, substantially as and for the purposes set forth.

3. The use of alum or any of the salts of alumina, for rendering a soapy compound insoluble in water, when said soapy compound has been previously incorporated with paper-pulp or fibre, substantially as described.

4. The use of glycerine, in combination with a gelatinous or a soapy compound, when applied to fibrous materials, substantially as set forth.

5. The new compound or composition of matter produced by the treatment of fibrous material, substantially as herein described.

6. The process herein described of treating fibrous material, for producing a new compound, substantially as described.

R. O. LOWREY.

Witnesses:
H. B. MUNN,
JOHN M. WILLIAMS.